(12) United States Patent
Lin

(10) Patent No.: US 11,569,929 B2
(45) Date of Patent: Jan. 31, 2023

(54) METHOD AND DEVICE FOR DETERMINING LENGTH OF FEEDBACK INFORMATION, AND COMMUNICATION APPARATUS

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 81 days.

(21) Appl. No.: 17/172,331

(22) Filed: Feb. 10, 2021

(65) Prior Publication Data
US 2021/0167888 A1 Jun. 3, 2021

Related U.S. Application Data

(63) Continuation of application No. PCT/CN2018/102265, filed on Aug. 24, 2018.

(51) Int. Cl.
*H04L 1/00* (2006.01)
*H04L 1/18* (2006.01)
*H04W 16/14* (2009.01)

(52) U.S. Cl.
CPC .......... *H04L 1/0007* (2013.01); *H04L 1/1819* (2013.01); *H04L 1/1854* (2013.01); *H04W 16/14* (2013.01)

(58) Field of Classification Search
None
See application file for complete search history.

(56) References Cited

U.S. PATENT DOCUMENTS

| 11,245,496 | B2* | 2/2022 | Peng | H04L 5/0055 |
| 2017/0280454 | A1 | 9/2017 | Kusashima et al. | |
| 2018/0294924 | A1* | 10/2018 | Jeon | H04L 1/1822 |
| 2019/0141727 | A1* | 5/2019 | Si | H04L 1/1887 |
| 2019/0363840 | A1* | 11/2019 | Wang | H04L 5/0055 |
| 2020/0092044 | A1* | 3/2020 | Park | H04L 1/189 |
| 2020/0337072 | A1* | 10/2020 | Lunttila | H04L 5/0055 |

FOREIGN PATENT DOCUMENTS

| CN | 104160767 A | 11/2014 |
| CN | 108352946 A | 7/2018 |
| CN | 108390741 A | 8/2018 |

OTHER PUBLICATIONS

EPO, Extended European Search Report for European Application No. 18930800.0, dated Jul. 22, 2021. 7 pages.
Huawei et al. "HARQ enhancements in NR unlicensed" R1-1808063. 3GPP TSG RAN WG1 Meeting #94. Aug. 20-24, 2018. 8 pages.

(Continued)

*Primary Examiner* — Saumit Shah
(74) *Attorney, Agent, or Firm* — Perkins Coie LLP

(57) ABSTRACT

Provided in implementations of the present disclosure are a method and device for determining a length of feedback information, and a communication apparatus. The method includes that a first node determines a number of feedback information bits according to information of a number of Hybrid Automatic Retransmission Request (HARQ) processes and information of at least one transmission resource.

13 Claims, 3 Drawing Sheets

A first node determines a bit quantity of feedback information according to information of a quantity of HARQ processes and information of a transmission resource ⟶ 201

(56) References Cited

OTHER PUBLICATIONS

OPPO "HARQ enhancements for NR-U" R1-1808895; 3GPP TSG RAN WG1 Meeting #94; Aug. 20-24, 2018. 4 pages.
Samsung "HARQ enhancements for NR-U" R1-1808770. 3GPP TSG RAN WG1 Meeting #94; Aug. 20-24, 2018. 6 pages.
3GPP TSG RAN WG1 #88bis—R1-1705618—Apr. 3-7, 2017—Spokane, USA—Qualcomm Incorporated, Multi-bit HARQ-ACK feedback HARQ design principle (4 pages).
International Search Report dated May 23, 2019 of PCT/CN2018/102265 (4 pages).

* cited by examiner

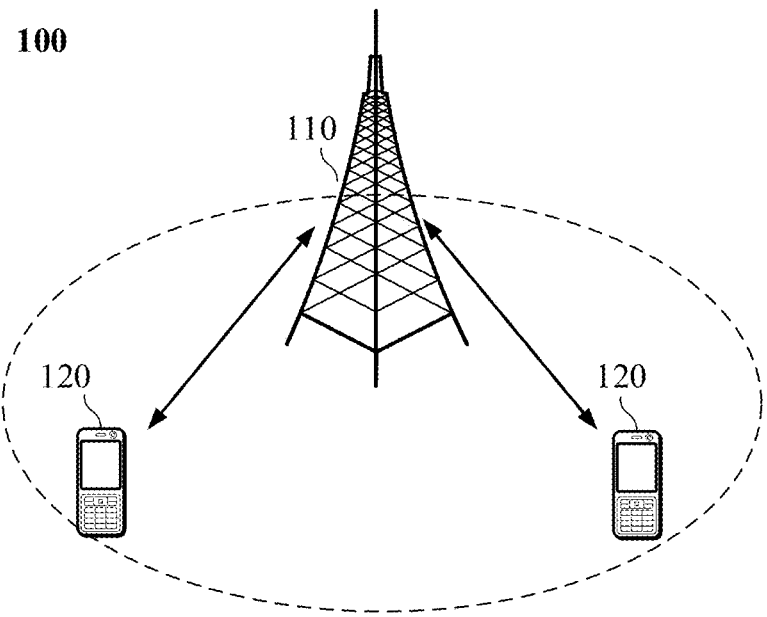
FIG. 1
A first node determines a bit quantity of feedback information according to information of a quantity of HARQ processes and information of a transmission resource ⟋201
FIG. 2
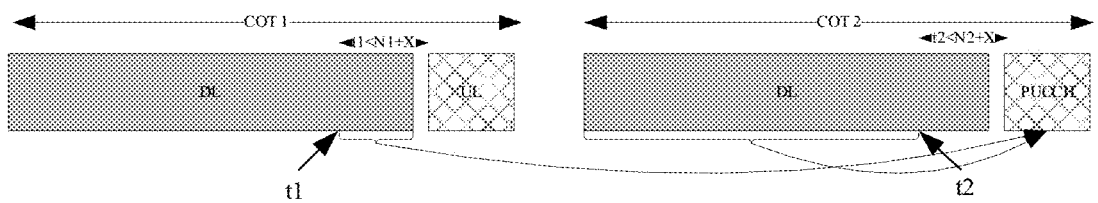
FIG. 3

METHOD AND DEVICE FOR DETERMINING LENGTH OF FEEDBACK INFORMATION, AND COMMUNICATION APPARATUS

CROSS-REFERENCE TO RELATED APPLICATION

This application is a continuation application of International Application No. PCT/CN2018/102265 filed on Aug. 24, 2018, the entire disclosure of which is hereby incorporated by reference.

TECHNICAL FIELD

Implementations of the present disclosure relate to the technical field of mobile communication, specifically to a method for determining a length of feedback information and an apparatus, and a communication device.

BACKGROUND

With development of wireless communication technology, a Long Term Evolution (LTE) system and a New Radio (NR) system will both consider deploying networks on an unlicensed spectrum to transmit data services using the unlicensed spectrum.

In order to reduce use of Listen Before Talk (LBT), once a sending end succeeds in occupying a channel, it should occupy continuous resources as many as possible for data transmission. On the other hand, a receiving end should multiplex and transmit feedback information (i.e., ACK/NACK information) as much as possible, that is, occupy a small number of time domain resources, and avoid an unnecessary LBT process. When the receiving end feeds back feedback information corresponding to multiple data channels to the sending end by multiplexing, how to efficiently determine a bit length of the feedback information is a problem to be solved.

SUMMARY

Implementations of the present disclosure provide a method for determining a length of feedback information and an apparatus, and a communication device.

A method for determining a length of feedback information provided by an implementation of the present disclosure includes: determining, by a first node, a number of feedback information bits according to information of a number of Hybrid Automatic Retransmission Request (HARQ) processes and information of a transmission resource.

An apparatus for determining a length of feedback information provided by an implementation of the present disclosure is applied to a first node, and the apparatus includes: a determining unit, configured to determine a number of feedback information bits according to information of a number of HARQ processes and information of a transmission resource.

A communication device provided by an implementation of the present disclosure includes a processor and a memory. The memory is configured to store a computer program, and the processor is configured to call and run the computer program stored in the memory to execute the above method for determining a length of feedback information.

A chip provided by an implementation of the present disclosure is configured to implement the above method for determining a length of feedback information.

Specifically, the chip includes a processor configured to call and run a computer program from a memory, so that a device in which the chip is installed performs the above method for determining a length of feedback information.

A computer readable storage medium provided by an implementation of the present disclosure is configured to store a computer program, wherein the computer program enables a computer to perform the above method for determining a length of feedback information.

A computer program product provided by an implementation of the present disclosure includes computer program instructions, wherein the computer program instructions enable a computer to perform the above method for determining a length of feedback information.

A computer program provided by the implementation of the present disclosure, when run on a computer, enables the computer to perform the above method for determining a length of feedback information.

BRIEF DESCRIPTION OF DRAWINGS

Drawings described herein are used to provide a further understanding of the present disclosure and form a part of the present disclosure. Illustrative implementations of the present disclosure and description thereof are used to explain the present disclosure and do not constitute improper limitation of the present disclosure. In the drawings:

FIG. 1 is a schematic diagram of an architecture of a communication system according to an implementation of the present disclosure.

FIG. 2 is a schematic flow chart of a method for determining a length of feedback information according to an implementation of the present disclosure.

FIG. 3 is a schematic diagram of a first time point and a second time point according to an implementation of the present disclosure.

DETAILED DESCRIPTION

Figure 4:
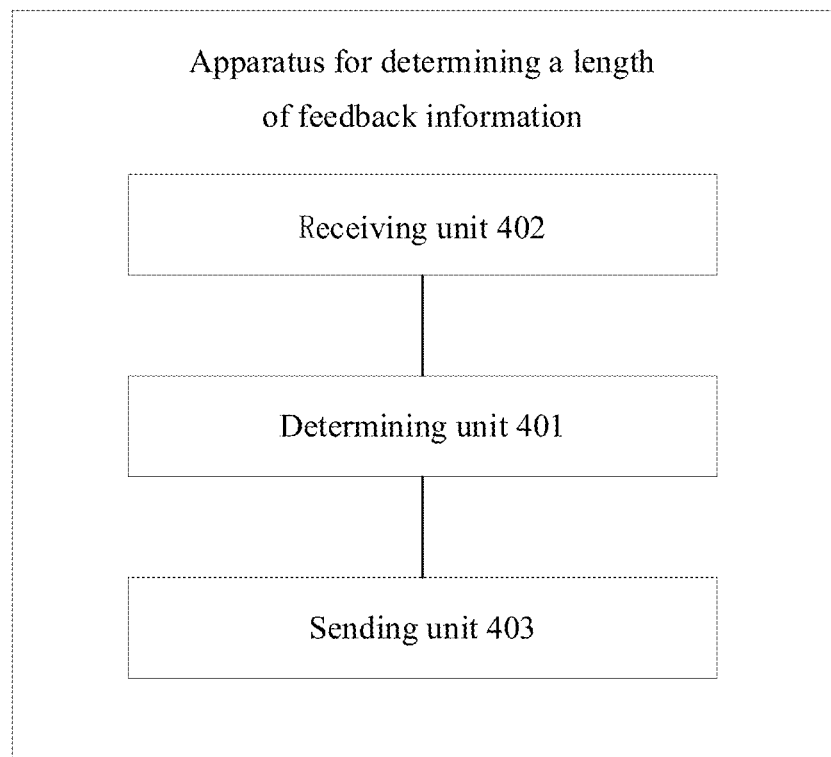
FIG. 4 is a schematic diagram of a structural composition of an apparatus for determining a length of feedback information according to an implementation of the present disclosure.

Technical solutions in implementations of the present disclosure will be described below with reference to the drawings in the implementations of the present disclosure. It is apparent that the implementations described are just some implementations of the present disclosure, but not all implementations of the present disclosure. According to the implementations of the present disclosure, all other implementations achieved by a person of ordinary skill in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Illustratively, a communication system 100 applied in an implementation of the present disclosure is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to connect via a wired circuit, for example, via a Public Switched Telephone Network (PSTN), a Digital Subscriber Line (DSL), a digital cable, a direct cable; and/or another data connection/network, and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of being combined with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiving end, and a conventional laptop and/or palmtop receiving end or other electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal device in a 5G network, or a terminal device in a future evolved Public Land Mobile Network (PLMN), or the like.

Optionally, a device to device (D2D) communication may be performed between the terminal devices 120.

Optionally, the 5G system or 5G network may be referred to as a New Radio (NR) system or a NR network.

FIG. 1 shows one network device and two terminal devices as an example. Optionally, the communication system 100 may include multiple network devices, and other quantity of terminal devices may be included within a coverage range of each network device, which is not limited in implementations of the present disclosure.

Optionally, the communication system 100 may include other network entities such as a network controller, and a mobile management entity, which are not limited in implementations of the present disclosure.

It should be understood that, a device with a communication function in a network/system in an implementation of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here. The communication device may also include other devices in the communication system 100, e.g., other network entities such as a network controller, a mobile management entity, etc., which are not limited in implementations of the present disclosure.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In order to facilitate understanding of technical solutions of implementations of the present disclosure, related technologies referred to by the implementations of the present disclosure will be explained below.

An unlicensed spectrum is a spectrum divided by countries and regions that may be used for radio device communications. The spectrum is usually considered as a shared spectrum, that is, communication devices in different communication systems may use the spectrum as long as they meet regulatory requirements set by the countries or regions on the spectrum, with no need to apply for exclusive spectrum authorization from a government. In order to make various communication systems using the unlicensed spectrum for wireless communications be capable of coexisting friendly on the spectrum, some countries or regions have stipulated legal requirements that must be met for using the unlicensed spectrum. For example, in some regions, a communication device follows a "listen before talk" principle, that is, before sending a signal on a channel of the unlicensed spectrum, the communication device needs to firstly listen to the channel, and only when a result of listening the channel is that the channel is idle, the communication device can send the signals; if a result of listening the channel of the communication device on the channel of the unlicensed spectrum is that the channel is busy, the communication device cannot send the signal.

An LTE system and an NR system will both consider deploying networks on an unlicensed spectrum to transmit data services using the unlicensed spectrum. When the NR system is applied to the unlicensed spectrum (abbreviated as NR-U), it is also necessary to follow an LBT principle. Technical solutions of implementations of the present disclosure may be applied to, but not limited to, a NR-U system, for example, which may be applied to an LTE-U system. In addition, the technical solutions of the implementations of the present disclosure are applicable to uplink ACK/NACK transmission as well as downlink ACK/NACK transmission.

FIG. 2 is a schematic flow chart of a method for determining a length of feedback information according to an implementation of the present disclosure. As shown in FIG. 2, the method for determining a length of feedback information includes following act 201.

In act 201, a first node determines a number of feedback information bits according to information of a number of HARQ processes and information of a transmission resource.

In an implementation of the present disclosure, after determining the number of the feedback information bits, the first node sends the feedback information to a second node based on the determined number of the feedback information bits.

Here, the first node and the second node may be implemented in following two modes:
1) the first node is a terminal and the second node is a base station; or,
2) the first node is a base station and the second node is a terminal.

Here, the terminal may be any device that may communicate with a network, such as a mobile phone, a tablet computer, a vehicle-mounted terminal, a notebook, etc. A type of the base station is not limited, such as a gNB in a 5G system.

In an implementation of the present disclosure, the first node refers to a data receiving end, that is, a sending end of feedback information. Correspondingly, the second node refers to a data sending end, that is, a receiving end of feedback information.

The technical solution of the implementation of the present disclosure is applicable to uplink ACK/NACK transmission as well as downlink ACK/NACK transmission. For example, after a base station sends downlink data to a UE, the UE needs to perform uplink HARQ-ACK feedback to the base station. For another example, after a UE sends uplink data to a base station, the base station needs to perform downlink HARQ-ACK feedback to the UE.

In an implementation of the present disclosure, the information of the number of HARQ processes includes:
1) a maximum number of HARQ processes supported by the first node; or,
2) a number of HARQ processes configured by the base station, herein the number of HARQ processes configured by the base station is less than or equal to the maximum number of HARQ processes supported by the first node.

For example, the maximum number of HARQ processes supported by the first node is 32, and the information of the number of HARQ processes may be 32, or may be a positive integer less than 32 configured by the base station.

In an implementation of the present disclosure, the transmission resource refers to a transmission resource that can be used for bearing target data, and the first node transmits feedback information of the target data. Further, the feedback information corresponding to the target data is transmitted by multiplexing.

Here, the feedback information corresponding to the target data is transmitted by multiplexing, which may be, but not limited to, transmitted by time division multiplexing.

In an implementation of the present disclosure, information of the transmission resource may be:
1) a number of transmission resource units in at least one Channel Occupation Time (COT). Further, the information of the transmission resource includes a number of transmission resource units with a same transmission direction in at least one COT. Or,
2) a number of all transmission resource units between a first time point and a second time point. Further, the information of transmission resource includes a number of all transmission resource units with a same transmission direction between the first time point and the second time point.

Here, one transmission resource unit is one slot, or, one transmission resource unit is one slot in one carrier, or, one transmission resource unit is one slot in one Band Width Part (BWP).

It should be noted that for an uplink data transmission, the transmission resource unit is an uplink transmission resource unit, and for a downlink data transmission, the transmission resource unit is a downlink transmission resource unit.

In the above solution, the second node (data sending end) may send target data to the first node on all transmission resource units between the first time point and the second time point, that is, the first node receives target data on all transmission resource units between the first time point and the second time point; Or, the second node (data sending end) may send target data to the first node on part of transmission resource units between the first time point and the second time point, that is, the first node receives the target data on part of transmission resource units between the first time point and the second time point.

For another example: the first node is UE1, the second node is a base station, the first time point is t1, and the second time point is t2. Then, the base station sends downlink data to multiple terminals in 10 slots within a duration taking t1 as a starting time point and t2 as an ending time point. For UE1, data is received only in 2 slots thereof, but UE1 considers that the corresponding transmission resources are still 10 slots.

In an implementation of the present disclosure, the first time point and/or the second time point may be determined in a following mode:
1) the first time point and/or the second time point are configured by the base station; or,
2) the first time point and/or the second time point are determined based on a processing latency.

Further, the first time point is determined according to a starting time point of a previous transmission of feedback information sent by the first node and the processing latency, and further, the first time point is determined according to a value obtained by subtracting the processing latency from the starting time point of the previous transmission of feedback information sent by the first node, for example, the first time is less than or equal to the time of the previous transmission of feedback information sent by the first node minus the processing latency; and/or the second time point is determined according to a starting time point of a current transmission of feedback information sent by the first node and the processing latency, and further, the second time point is determined according to a value obtained by subtracting the processing latency from the starting time point of the current transmission of feedback information sent by the first node, for example, the second time is less than or equal to the time of the current transmission of feedback information sent by the first node minus the processing latency. With reference to FIG. 3, two COTs are schematically shown in FIG. 3, which are COT1 and COT2 respectively. COT1 is earlier than COT2, a time period corresponding to UL in COT1 represents that the time period of a previous transmission of feedback information sent by the first node is set to N1, and a time period corresponding to PUCCH in COT2 represents the time N2 of a current transmission of feedback information sent by the first node, assuming that a processing latency of the first node is X, then t1<N1+X, t2<N2+X. It needs to be clear that, t1 to t2 span two COTs, and the feedback information sent by the first node on PUCCH in COT2 is for two parts of downlink data, which refer to DL part corresponding to curly braces in COT1 and DL part corresponding to curly braces in COT2 in FIG. 3.

Furthermore, if a time period determined by the first time point and the second time point is periodic in time, then the second time point corresponding to previous reception of the transmission resource by the first node is the first time point corresponding to current reception of the transmission resource by the first node.

In an implementation of the present disclosure, the first node determines a number of feedback information bits according to a minimum value between the information of the number of HARQ processes and the information of the transmission resource. Further, the first node multiplies the minimum value between the information of the number of HARQ processes and the information of the transmission resource by a first coefficient as the number of the feedback information bits. Here, the first coefficient is a constant, or, the first coefficient is a maximum number of Transmission Blocks (TBs) included in one HARQ process, or, the first coefficient is a maximum number of Code Block Groups (CBGs) included in one HARQ process.

For example, if the information of the number of HARQ processes is $N_{harq}$, and the information of the transmission resource is $N_{slot}$, then, the number of the feedback information bits is $C \cdot min(N_{harq}, N_{slot})$, herein, C is the first coefficient.

Furthermore, if a minimum value between the information of the number of HARQ processes and the information of the transmission resource is the information of the transmission resource, then the feedback information has a corresponding relationship with information of the transmission resource index, herein the information of the transmission resource index includes information of time domain index and/or information of frequency domain index.

For example, the transmission resource corresponds to 10 slots {S1, S2, S3, ..., S10}, the number of HARQ processes is 16, and a single TB transmission is applied. The terminal receives PDSCHs in S1 and S2, but does not receive data in other slots, then the terminal gets 10 feedback information bits, which respectively correspond to 10 slots, {b1, b2, NACK, NACK, ..., NACK}, herein b1 and b2 respectively correspond to feedback information of the PDSCHs in S1 and S2 (determined as an ACK or NACK according to a decoding result), and other bits are occupied by NACKs.

Furthermore, if a minimum value between the information of the number of HARQ processes and the information of the transmission resource is the information of the number of HARQ processes, then the feedback information has a corresponding relationship with information of the HARQ process index.

For example, the transmission resource corresponds to 10 slots {S1, S2, S3, ..., S10}, the number of HARQ processes is 8, a single TB transmission is applied. The terminal receives a HARQ process number of 4 corresponding to a PDSCH in S1, and a HARQ process number of 1 corresponding to a PDSCH in S3, and does not receive data in other slots, then the terminal gets 8-bit feedback information respectively corresponding to 8 HARQ processes, {$b_{S3}$, NACK, NACK, $b_{S1}$, NACK, NACK}, herein $b_{S3}$ is feedback information of the PDSCH in S3 (determined as an ACK or NACK according to a decoding result), $b_{S1}$ is feedback information of the PDSCH in S1, and other bits are occupied by NACKs.

FIG. 4 is a schematic diagram of a structural composition of an apparatus for determining a length of feedback information according to an implementation of the present disclosure. As shown in FIG. 4, the apparatus includes:
  a determining unit 401, configured to determine a number of feedback information bits according to information of a number of HARQ processes and information of a transmission resource.

In an implementation, the information of the number of HARQ processes includes: a maximum number of HARQ processes supported by the first node, or, a number of HARQ processes configured by the base station, herein the number of HARQ processes configured by the base station is less than or equal to the maximum number of HARQ processes supported by the first node.

In an implementation, the transmission resource refers to a transmission resource that is capable of being used for bearing target data, and the first node transmits feedback information of the target data.

In an implementation, the feedback information corresponding to the target data is transmitted by multiplexing.

In an implementation, the information of the transmission resource includes a number of transmission resource units in at least one COT.

In an implementation, the information of the transmission resource includes a number of transmission resource units with a same transmission direction in at least one COT.

In an implementation, the information of the transmission resource includes a number of all transmission resource units between a first time point and a second time point.

In an implementation, the information of the transmission resource includes a number of all transmission resource units with a same transmission direction between a first time point and a second time point.

In an implementation, the apparatus further includes:
  a receiving unit 402, configured to receive target data on all transmission resource units between the first time point and the second time point; or, receive target data on part of transmission resource units between the first time point and the second time point.

In an implementation, the first time point and/or the second time point are configured by the base station.

In an implementation, the first time point and/or the second time point are determined based on a processing latency.

In an implementation, the first time point and/or the second time point are determined based on the processing latency, including: the first time point is determined according to a starting time point of a previous transmission of feedback information sent by the first node and the processing latency, and/or, the second time point is determined according to a starting time point of a current transmission of feedback information sent by the first node and the processing latency.

In an implementation, the second time point corresponding to previous reception of the transmission resource by the first node is the first time point corresponding to current reception of the transmission resource by the first node.

In an implementation, one transmission resource unit is one slot, or, one transmission resource unit is one slot in one carrier, or, one transmission resource unit is one slot in one BWP.

In an implementation, the determining unit 401 is configured to determine a number of feedback information bits according to a minimum value between the information of the number of HARQ processes and the information of the transmission resource.

In an implementation, the determining unit 401 multiplies the minimum value between the information of the number of HARQ processes and the information of the transmission resource by a first coefficient as the number of the feedback information bits.

In an implementation, the first coefficient is a constant, or, the first coefficient is a maximum number of TB included in one HARQ process, or, the first coefficient is a maximum number of CBG included in one HARQ process.

In an implementation, if a minimum value between the information of the number of HARQ processes and the information of the transmission resource is the information of the transmission resource, then the feedback information has a corresponding relationship with information of the transmission resource index, herein the information of the transmission resource index includes information of time domain index and/or information of frequency domain index.

In an implementation, if a minimum value between the information of the number of HARQ processes and the information of the transmission resource is the information of the number of HARQ processes, then the feedback information has a corresponding relationship with information of the HARQ process index.

In an implementation, the apparatus further includes:
a sending unit 403, configured to send feedback information to a second node based on the determined number of the feedback information bits.

In an implementation, the first node is a terminal and the second node is a base station, or, the first node is a base station and the second node is a terminal.

Those skilled in the art should understand that relevant descriptions of the above apparatus for determining a length of feedback information of the implementation of the present disclosure may be understood with reference to relevant descriptions of the method for determining a length of feedback information of the implementation of the present disclosure.

Figure 5:
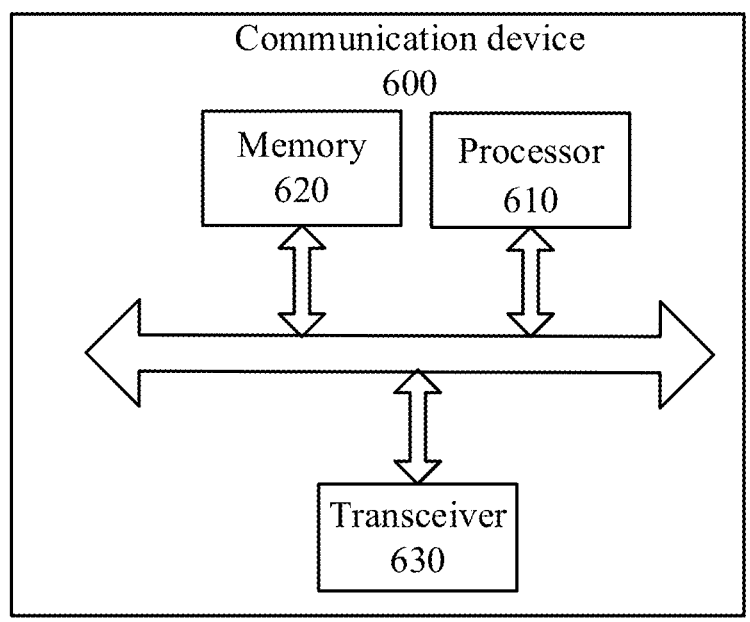
FIG. 5 is a schematic diagram of a structure of a communication device according to an implementation of the present disclosure.

FIG. 5 is a schematic diagram of a structure of a communication device 600 according to an implementation of the present disclosure. The communication device may be a terminal device or a network device. The communication device 600 shown in FIG. 5 includes a processor 610. The processor 610 may call and run a computer program from a memory to implement the methods of the implementations of the present disclosure.

Optionally, as shown in FIG. 5, the communication device 600 may further include a memory 620. The processor 610 may call and run a computer program from the memory 620 to implement the methods of the implementations of the present disclosure.

The memory 620 may be a separate device independent of the processor 610 or may be integrated in the processor 610.

Optionally, as shown in FIG. 5, the communication device 600 may further include a transceiver 630, and the processor 610 may control the transceiver 630 to communicate with other devices, specifically, to send information or data to other devices, or to receive information or data sent by other devices.

Herein, the transceiver 630 may include a transmitter and a receiver. The transceiver 630 may further include an antenna, and a number of antennas may be one or more.

Optionally, the communication device 600 may specifically be a network device of the implementation of the present disclosure, and the communication device 600 may implement corresponding processes implemented by the network device in various methods of the implementations of the present disclosure, which will not be repeated here for brevity.

Optionally, the communication device 600 may be specifically a mobile terminal/terminal device of the implementations of the present disclosure, and the communication device 600 may implement corresponding processes implemented by the mobile terminal/terminal device in various methods of the implementations of the present disclosure, which will not be repeated here for brevity.

Figure 6:
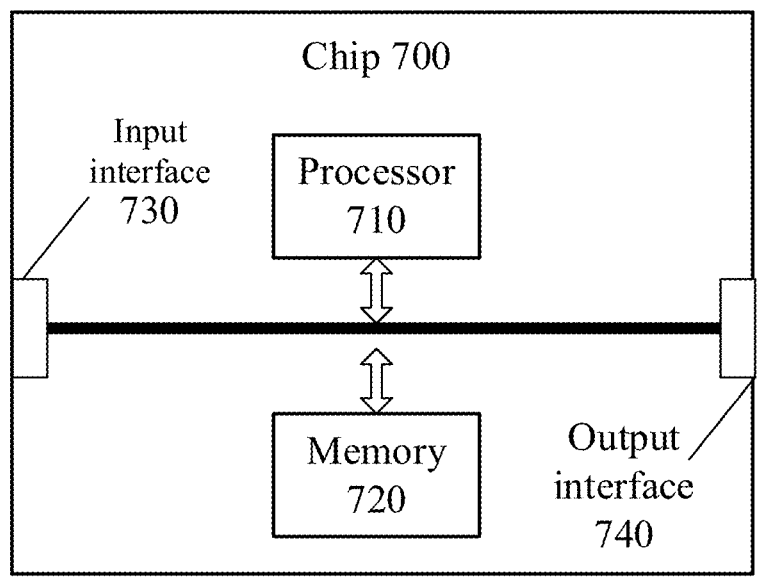
FIG. 6 is a schematic diagram of a structure of a chip according to an implementation of the present disclosure.

FIG. 6 is a schematic diagram of a structure of a chip according to an implementation of the present disclosure. A chip 700 shown in FIG. 6 includes a processor 710. The processor 710 may call and run a computer program from a memory to implement the methods of the implementations of the present disclosure.

Optionally, as shown in FIG. 6, the chip 700 may further include a memory 720. The processor 710 may call and run a computer program from the memory 720 to implement the methods of the implementations of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied in a network device of the implementations of the present disclosure, and the chip may implement the corresponding processes implemented by the network device in various methods of the implementations of the present disclosure, which will not be repeated here for brevity.

Optionally, the chip may be applied in a mobile terminal/terminal device of the implementations of the present disclosure, and the chip may implement the corresponding processes implemented by the mobile terminal/terminal device in the various methods of the implementations of the present disclosure, which will not be repeated here for brevity.

It should be understood that the chip mentioned in the implementations of the present disclosure may be referred to as a system-level chip, a system chip, a chip system or a system-on-chip, etc.

Figure 7:
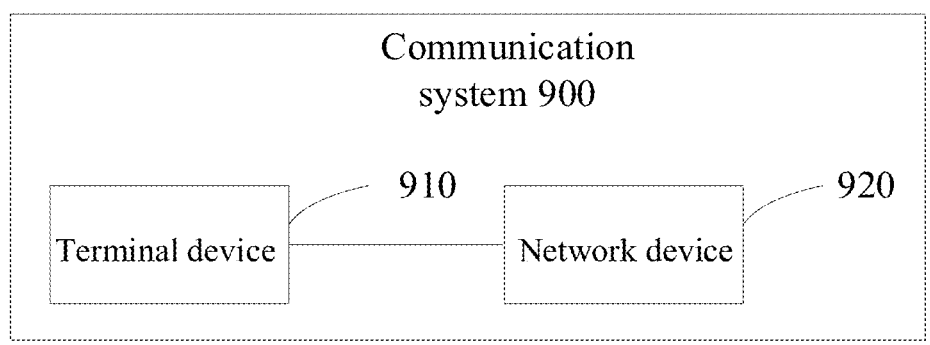
FIG. 7 is a schematic block diagram of a communication system according to an implementation of the present disclosure.

FIG. 7 is a schematic block diagram of a communication system 900 according to an implementation of the present disclosure. As shown in FIG. 7, the communication system 900 may include a terminal device 910 and a network device 920.

Herein, the terminal device 910 may be configured to implement the corresponding functions implemented by the terminal device in the above methods, and the network device 920 may be configured to implement the corresponding functions implemented by the network device in the above methods, which will not be repeated here for brevity.

It should be understood that, the processor in the implementations of the present disclosure may be an integrated circuit chip having a signal processing capability. In an implementation process, various acts of the above method implementations may be implemented through an integrated logic circuit of hardware in the processor or instructions in a form of software. The above processor may be a general purpose processor, a Digital Signal Processing (DSP), an Application Specific Integrated Circuit (ASIC), a Field Programmable Gate Array (FPGA) or another programmable logic device, a discrete gate or a transistor logic device, or a discrete hardware component. Various methods, acts and logical block diagrams disclosed in the implementations of the present disclosure may be implemented or performed. The general purpose processor may be a microprocessor, or the processor may be any conventional processor or the like. The acts of the methods disclosed with reference to the implementations of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above methods in combination with its hardware.

It may be understood that, the memory in the implementations of the present disclosure may be a transitory memory or a non-transitory memory, or may include both a transitory memory and a non-transitory memory. The non-transitory memory may be a read-only memory (ROM), a programmable read-only memory PROM), an erasable programmable read-only memory (EPROM), an electrically erasable programmable read-only memory (EEPROM), or a flash memory. The transitory memory may be a random access memory (Random Access Memory, RAM), and is used as an external cache. Through illustrative but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory in the systems and methods described in the document is intended to include, but is not limited to, these and any memory of other proper types.

It should be understood that, the foregoing memory is an example for illustration and should not be construed as a limitation. For example, optionally, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied in a network device of the implementations of the present disclosure, and the computer program causes a computer to perform corresponding processes implemented by the network device in various methods of the implementations of the present disclosure, which will not be repeated here for brevity.

Optionally, the computer readable storage medium may be applied in a mobile terminal/terminal device of the implementations of the present disclosure, and the computer program causes a computer to perform corresponding processes implemented by the mobile terminal/terminal device in various methods of the implementations of the present disclosure, which will not be repeated here for brevity.

An implementation of the present disclosure also provides a computer program product including computer program instructions.

Optionally, the computer program product may be applied in a network device of the implementations of the present disclosure, and the computer program instructions enable a computer to perform corresponding processes implemented by the network device in various methods of the implementations of the present disclosure, which will not be repeated here for brevity.

Optionally, the computer program product may be applied in a mobile terminal/terminal device of the implementations of the present disclosure, and the computer program instructions enable a computer to perform corresponding processes implemented by the mobile terminal/terminal device in various methods according to the implementation of the present disclosure, which will not be repeated here for brevity.

An implementation of the present disclosure also provides a computer program.

Optionally, the computer program may be applied in a network device of the implementations of the present disclosure. When the computer program is run on a computer, the computer is enabled to perform corresponding processes implemented by the network device in various methods of the implementations of the present disclosure, which will not be repeated here for brevity.

Optionally, the computer program may be applied in a mobile terminal/terminal device of the implementations of the present disclosure. When the computer program is run on a computer, the computer is enabled to perform corresponding processes implemented by the mobile terminal/terminal device in various methods of the implementations of the present disclosure, which will not be repeated here for brevity.

Those of ordinary skill in the art will recognize that the example elements and algorithm acts described in combination with the implementations disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, specific working processes of the systems, apparatuses and units described above may refer to the corresponding processes in the method implementations and will not be described here.

In several implementations provided by the present disclosure, it should be understood that the disclosed systems, apparatuses and methods may be implemented in other modes. For example, the apparatus implementations described above are only illustrative, for example, the division of the units is only logical function division, and there may be other division modes in an actual implementation, for example, multiple units or components may be combined or integrated into another system, or some features may be ignored or not performed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for enabling a computer device (which may be a personal computer, a server, or a network device and the like) to perform all or part of the acts of the method described in various implementations of the present disclosure. And the foregoing storage medium includes: various media that can store program codes, such as a USB flash drive, a removable hard disk, a Read-Only Memory (ROM), a Random Access Memory (RAM), a magnetic disk, or an optical disc, etc.

What are described above are merely specific implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for determining a length of feedback information, comprising:
   determining, by a first node, a number of feedback information bits according to information of a number of Hybrid Automatic Retransmission Request (HARQ) processes and information of at least one transmission resource;
   wherein determining, by the first node, the number of the feedback information bits according to the information of the number of HARQ processes and the information of the at least one transmission resource, comprises:
      determining, by the first node, the number of the feedback information bits according to a minimum value between the information of the number of HARQ processes and the information of the at least one transmission resource;
   wherein the information of the number of HARQ processes comprises a number of HARQ processes configured by a base station, wherein the number of HARQ processes configured by the base station is less than or equal to a maximum number of HARQ processes supported by the first node;
   wherein the information of the at least one transmission resource comprises a number of all transmission resource units with a same transmission direction between a first time point and a second time point.

2. The method according to claim 1, wherein the transmission resource refers to a transmission resource used to transmit target data, and the first node transmits feedback information corresponding to the target data; wherein the feedback information corresponding to the target data is transmitted by multiplexing.

3. The method according to claim 1, wherein the method further comprises:
   receiving, by the first node, target data on the all transmission resource units between the first time point and the second time point; or,
   receiving, by the first node, target data on part of the transmission resource units between the first time point and the second time point.

4. The method according to claim 1, wherein the first time point is determined based on a processing latency; and/or the second time point is determined based on the processing latency.

5. The method according to claim 4, wherein the first time point is determined based on the processing latency, comprises:
   the first time point is determined according to a starting time point of a previous transmission of feedback information sent by the first node and the processing latency; and
   the second time point is determined based on the processing latency, comprises:
   the second time point is determined according to a starting time point of a current transmission of feedback information sent by the first node and the processing latency;
   wherein the second time point corresponding to previous reception of the transmission resource of the first node is the first time point corresponding to current reception of the transmission resource of the first node.

6. The method according to claim 1, wherein determining, by the first node, the number of the feedback information bits according to the minimum value between the information of the number of HARQ processes and the information of the transmission resource, comprises:
   the number of the feedback information bits is the minimum value between the information of the number of HARQ processes and the information of the transmission resource multiplied by a first coefficient;
   wherein the first coefficient is a constant; or,
   the first coefficient is a maximum number of Transmission Blocks (TBs) included in one HARQ process; or,
   the first coefficient is a maximum number of Code Block Groups (CBGs) included in one HARQ process.

7. The method according to claim 1, wherein,
   if a minimum value between the information of the number of HARQ processes and the information of the transmission resource is the information of the transmission resource, then the feedback information has a corresponding relationship with information of the transmission resource index, wherein the information of the transmission resource index comprises information of time domain index and/or information of frequency domain index; or if a minimum value between the information of the number of HARQ processes and the information of the transmission resource is the information of the number of HARQ processes, then the feedback information has a corresponding relationship with information of the HARQ process index.

8. The method according to claim 1, wherein the method further comprises:

sending feedback information to a second node based on the determined number of the feedback information bits;

wherein the first node is a terminal and the second node is a base station; or, the first node is a base station, and the second node is a terminal.

9. An apparatus for determining a length of feedback information, applied to a first node, comprising a processor and a transceiver, wherein the processor is configured to determine a number of feedback information bits according to information of a number of Hybrid Automatic Retransmission Request (HARQ) processes and information of at least one transmission resource;

wherein the processor is configured to determine the number of feedback information bits according to a minimum value between the information of the number of HARQ processes and the information of the at least one transmission resource;

wherein the information of the number of HARQ processes comprises a number of HARQ processes configured by a base station, wherein the number of HARQ processes configured by the base station is less than or equal to a maximum number of HARQ processes supported by the first node;

wherein the information of the at least one transmission resource comprises a number of all transmission resource units with a same transmission direction between a first time point and a second time point.

10. The apparatus according to claim 9, wherein the transmission resource refers to a transmission resource used to transmit target data, and the first node transmits feedback information corresponding to the target data; wherein the feedback information corresponding to the target data is transmitted by multiplexing.

11. The apparatus according to claim 9, wherein the transceiver is configured to receive target data on the all transmission resource units between the first time point and the second time point; or, receive target data on part of the transmission resource units between the first time point and the second time point.

12. The apparatus according to claim 9, wherein if a minimum value between the information of the number of HARQ processes and the information of the transmission resource is the information of the transmission resource, then the feedback information has a corresponding relationship with information of the transmission resource index, wherein the information of the transmission resource index comprises information of time domain index and/or information of frequency domain index; or if a minimum value between the information of the number of HARQ processes and the information of the transmission resource is the information of the number of HARQ processes, then the feedback information has a corresponding relationship with information of the HARQ process index.

13. The apparatus according to claim 9, wherein the transceiver is configured to send feedback information to a second node based on the determined number of the feedback information bits;

wherein the first node is a terminal and the second node is a base station; or, the first node is a base station, and the second node is a terminal.

* * * * *